(12) United States Patent
Chen et al.

(10) Patent No.: US 8,854,453 B2
(45) Date of Patent: *Oct. 7, 2014

(54) DETERMINING GEOGRAPHIC POSITION INFORMATION FROM A SINGLE IMAGE

(75) Inventors: Xin Chen, Evanston, IL (US);
Xiangheng Yang, Glenview, IL (US);
Roger B. Hui, Northbrook, IL (US);
Narayanan Alwar, South Barrington, IL (US)

(73) Assignee: HERE Global B.V., Veldhoven (NL)

( * ) Notice: Subject to any disclaimer, the term of this patent is extended or adjusted under 35 U.S.C. 154(b) by 613 days.

This patent is subject to a terminal disclaimer.

(21) Appl. No.: 12/489,737

(22) Filed: Jun. 23, 2009

(65) Prior Publication Data

US 2010/0321489 A1    Dec. 23, 2010

(51) Int. Cl.
*H04N 7/00* (2011.01)
*H04N 7/18* (2006.01)
*G06K 9/00* (2006.01)
*G01C 21/32* (2006.01)
*G01C 11/02* (2006.01)
*G01S 5/16* (2006.01)

(52) U.S. Cl.
CPC . *G01S 5/16* (2013.01); *G01C 21/32* (2013.01); *G01C 11/02* (2013.01)
USPC .......................... 348/118; 348/116; 382/100

(58) Field of Classification Search
CPC ........... G01C 11/02; G01C 21/32; G01S 5/16
USPC ....................................................... 348/116
See application file for complete search history.

(56) References Cited

U.S. PATENT DOCUMENTS

| | | | |
|---|---|---|---|
| 5,073,819 A | 12/1991 | Gates et al. | |
| 5,521,843 A | 5/1996 | Hashima et al. | |
| 5,790,403 A | 8/1998 | Nakayama | |
| 6,477,260 B1 | 11/2002 | Shimomura | |
| 6,990,253 B2 | 1/2006 | Takeda et al. | |
| 7,405,746 B2 * | 7/2008 | Wakimoto et al. | 348/116 |
| 2009/0140887 A1 | 6/2009 | Breed et al. | |
| 2009/0262974 A1 * | 10/2009 | Lithopoulos | 382/100 |
| 2010/0121886 A1 | 5/2010 | Koshiba et al. | |

OTHER PUBLICATIONS

Office Action in co-pending U.S. Appl. No. 12/489,697, dated Jan. 26, 2012.

* cited by examiner

*Primary Examiner* — Hee-Yong Kim
(74) *Attorney, Agent, or Firm* — Lempia Summerfield Katz LLC

(57) ABSTRACT

Systems, devices, features, and methods for determining geographic position information from an image are disclosed. For example, one method for determining the geographic position information is used to develop a navigation database. The method comprises capturing a plurality of images of geographic features by a camera mounted on a vehicle or a pedestrian. A single image from the plurality of images is identified or selected. A real-world ground distance between a reference ground point in the single image and a ground point corresponding to an object in the single image is determined based on determined calibration values corresponding to the camera. Real-world geographic position information, such as a latitude coordinate and a longitude coordinate, of the ground point corresponding to the object in the single image is determined based on the determined real-world ground distance.

20 Claims, 6 Drawing Sheets

DETERMINING GEOGRAPHIC POSITION INFORMATION FROM A SINGLE IMAGE

REFERENCE TO RELATED APPLICATIONS

The present patent application is related to the copending patent application filed on the same date, Ser. No. 12/489,697, entitled "DETERMINING A GEOMETRIC PARAMETER FROM A SINGLE IMAGE," the entire disclosure of which is incorporated by reference herein.

BACKGROUND OF THE INVENTION

The present invention relates to analyzing image data and, more particularly, to determining geographic position information from a single image.

Geographic position information, such as, for example, real-world coordinates and/or other position data, of an object may be determined for a variety of applications and fields. For example, navigation systems or devices may use geographic position information of geographic objects to provide guidance and/or visual displays to end users. In one embodiment, a navigation system or device may provide realistic placement of visual models of points-of-interest ("POIs"), signs, and other road features based on substantially accurate real-world geographic position data of those geographic features. Also, the navigation system or device may provide better route guidance, route calculation, safety features, and/or other navigation-related functions based on substantially accurate real-world geographic position data, such as latitude and longitude coordinates of various geographic objects.

Geographic position information, such as for road objects, may be determined by real-world measurements, such as by hired personnel that use handheld position or GPS ("Global Positioning System") devices. However, real-world measurements for multiple geographic features may be time consuming and costly if not impractical or improbable. Some systems may use multiple cameras to focus on a geographic feature, and correspondence calculations between the cameras are used to determine geographical position information of the geographic feature. Also, multiple images of the same geographic feature may be used to determine geographic position information, such as via triangulation. However, the use of multiple cameras and/or multiple images to estimate geographic position data for a geographic object may involve increased complexity, time, and cost.

SUMMARY OF THE INVENTION

According to one aspect, a method of determining a geographic location in an image is disclosed. For example, the method comprises determining calibration values relating to a camera. The camera captures an image at the determined calibration values. A reference point in the image is identified. The reference point corresponds to a predetermined position relative to the camera. A selected point in the image is identified. The selected point corresponds to a real-world location represented in the image. A real-world distance between the reference point and the selected point in the image is determined based on the calibration values. Real-world geographic coordinates corresponding to the selected point are determined based on the determined real-world distance.

The present invention is defined by the following claims, and nothing in this section should be taken as a limitation on those claims. Further aspects and advantages of the invention are discussed below in conjunction with the preferred embodiments.

DETAILED DESCRIPTION OF THE PRESENTLY PREFERRED EMBODIMENTS

Figure 1:
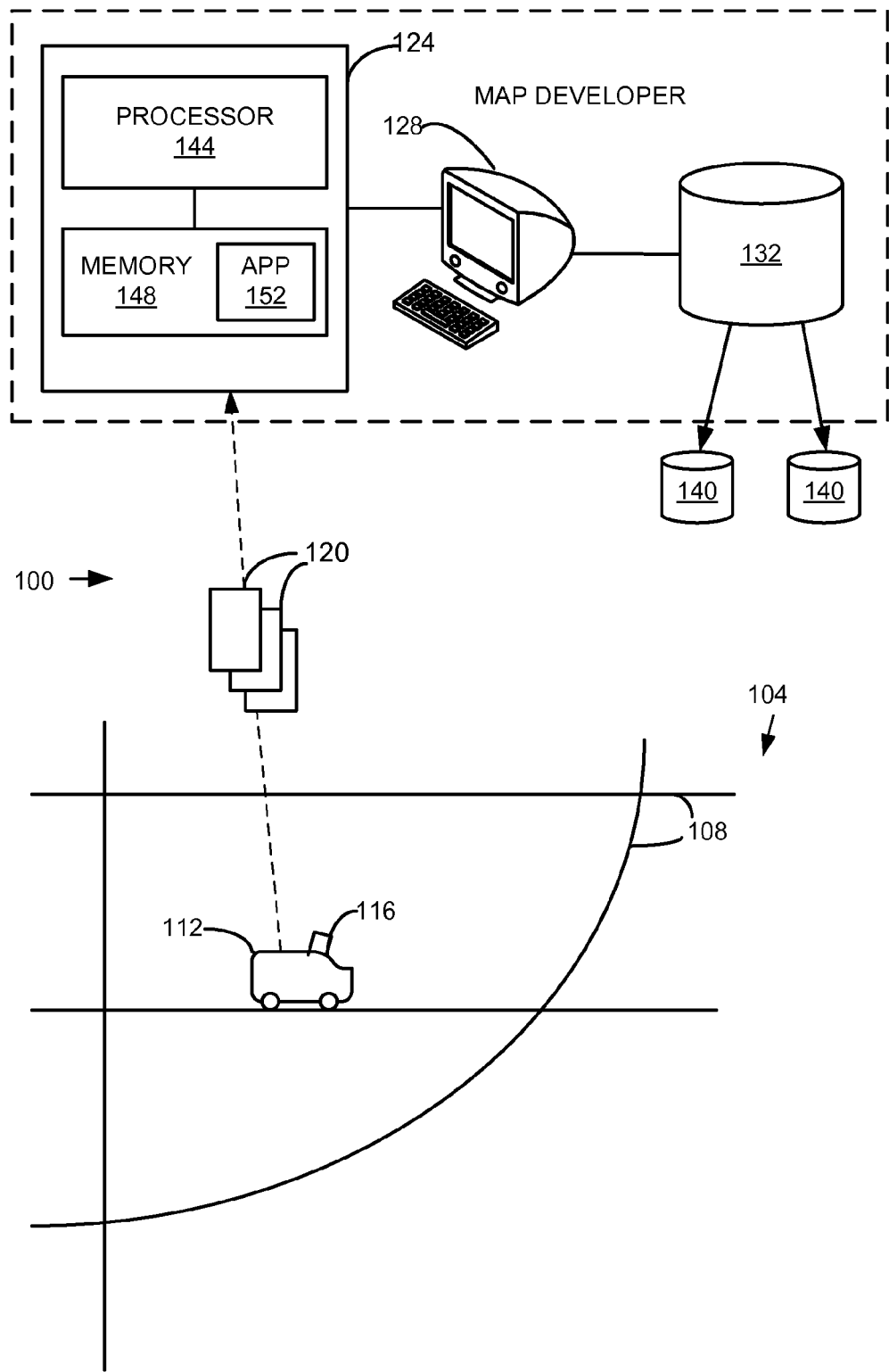
FIG. 1 is a diagram of a system for determining geographic position information from a single image to develop a navigation database.

FIG. 1 shows one embodiment of a system 100 for determining geographic position information or geo-referencing from a single image to develop a navigation database. The system 100 includes, but is not limited to, an object 112 travelling on a path network 108 in a geographic region 104, a processing device 124, a user interface or work station 128, and a geographic, map, navigation, and/or navigation-related database 132. Additional, fewer, or different components may be provided.

The object 112 is a vehicle, such as a car, truck, motorcycle, bicycle, Segway, or other transportation device or mechanical device used to move on the path network 108. Alternatively, the object 112 may represent a pedestrian, such as a human being or animal, that walks or moves along the path network 108. The path network 108 is a road network and/or a collection of other pathways. For example, the path network 108 is a road network made up of various roads. The roads may be used to drive vehicles on, such as local and neighborhood streets as well as highways. Also, instead of or in addition to traditional streets, the path network 108 may include bicycle roads or paths, walking paths, or other travel paths. The path network 108 is in a geographic region 104, such as a city, a suburb, a state, a country, and/or other geographic region.

The object 112 travels along or moves about the path network 108 to collect data associated with one or more paths or roads of the path network 108. For example, a supporting device or housing 116 is attached or connected with or carried by the object 112. The supporting device 116 may be or may include equipment to collect data representing an area about or around a road or path. For example, the collected data may be imagery or video/camera data (such as in the visible spectrum or other spectrum). In one embodiment, the supporting device 116 is a housing or container that is attached to a vehicle, and as the vehicle is on and/or moving on a road, equipment, such as a video and/or photograph camera, in the supporting device 116 collects or gathers data corresponding to the surrounding area. Alternatively, the supporting device 116 may be the camera itself or parts thereof. The supporting device 116 may be positioned at a frontend of the vehicle and may be angled to enhance collection. In other embodiments, the supporting device 116 may be positioned any place on the vehicle and in any direction.

The collected data is stored on one or more computer-readable media 120, such as a CD-ROM, DVD, flash drive, hard drive, or other tangible media suitable to store data. Different types of data may be stored on the same medium 120. Alternatively, separate media 120 may be used to store separate or different types of data. In one embodiment, photographs (such as digital or electronic photographs), video images, and/or other image data collected by the object 112 is stored in one or more media 120. Alternatively, the media 120 may be signals carrying or having image data. The collected image data or images may represent areas or regions about or around a path or road. The collected images may include geographic features, such as road or path markings, road or path signs, POIs, and other features or objects.

The collected image data, via one or more media 120, is sent to a map, geographic, and/or navigation data developer, such as NAVTEQ North America, LLC located in Chicago, Ill. For example, a medium 120 may be mailed to or brought to the map developer. Alternatively, some or all of the collected data may be transmitted to the map developer via a wireless and/or wired network. For example, the network may include the Internet, an intranet, a local area network ("LAN"), a wide area network ("WAN"), a virtual private network ("VPN"), a server network, a cellular network, a satellite network, a broadcasting network, a wireless or wired connection, and/or any known or future network or connection. The term "map developer" may also include third-party contractors.

The processing device 124 maintained by the map developer receives the collected image data, via the medium 120 or other means. The processing device 124 is one or more computers (such as a desktop tower or a laptop processing unit), processors, or other electronic processing systems or devices. The user interface or workstation 128 includes a display and input devices (such as a keyboard, mouse, voice recognition circuit, or other input device) that are associated with the processing device 124. In one embodiment, the processing device 124 and the user interface 128 are part of the same computer system or workstation. In another embodiment, the processing device 124 and the user interface or workstation 128 are separate computers. For example, the processing device 124 may be a server and the workstation 128 may be a separate computer in communication with the server 124.

The processing device 124 includes, but is not limited to, a processor 144, a memory 148, and a geographic position software application 152. The processor 144 is a general processor, application-specific integrated circuit ("ASIC"), digital signal processor, field programmable gate array ("FPGA"), digital circuit, analog circuit, or combinations thereof. The processor 144 is one or more processors operable to control and/or communicate with the various electronics and logic of the processing device 124 and/or the user interface or workstation 128. The memory 148 is any known or future storage device. The memory 148 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 148 may be part of the processor 144. The memory 148 is operable or configured to store collected image data and/or other data.

The processor 144 is configured or adapted to execute the geographic position software application 152, which may be stored in the memory 148 or other memory. For example, the geographic position software application calculates or determines real-world geographic position information (such as latitude, longitude, and/or altitude coordinates) in or from images. In one embodiment, a single image may be displayed on the user interface 128, and a user (such as an employee of the map developer) may select an area, object, geographic feature, and/or point in the image to determine one or more geographic coordinates, such as a latitude or longitude value, of the object or feature or point thereof from the single image. Real-world geographic position information and/or coordinates of road or path features, such as lanes, road or path markings, signs, POIs, and/or other objects, may be used to enhance or develop the navigation database 132. For example, the determined position data may be stored with or associated with existing navigation or map-related data of the master database 132.

In one embodiment, the geographic database 132 includes data used for navigation-related services. For example, the geographic database 132 contains road segment and node data records that represent a road network, such as the path network 108. A node represents an end point of a road segment. The road segments and nodes may be associated with attributes, such as geographic coordinates, street names, address ranges, speed limits, turn restrictions at intersections, and other navigation attributes, as well as POIs, such as gasoline stations, hotels, restaurants, museums, stadiums, offices, automobile dealerships, auto repair shops, buildings, stores, etc. Alternatively, the geographic database 132 contains path segment and node data records or other data that represent pedestrian paths in addition to or instead of the vehicle road record data.

The geographic database 132 may be a master geographic database that is stored in a format that facilitates updating, maintenance, and development. For example, the master geographic database 132 or data in the master geographic database 132 is in an Oracle spatial format, such as for development or production purposes. The Oracle spatial format or development/production database may be compiled into a delivery format, such as a GDF format. The data in the production and/or delivery formats may be compiled or further compiled to form geographic database products or databases 140, which may be used in end user navigation devices or systems.

For example, geographic data is compiled (such as into a PSF format) to organize and/or configure the data for performing navigation-related functions and/or services, such as route calculation, route guidance, map display, speed calculation, distance and travel time functions, and other functions, by a navigation device. The navigation-related functions may correspond to vehicle navigation, pedestrian navigation, or other types of navigation.

When storing the geographic position data or information determined by the processing device 124 and applications thereof, the determined position data may be associated with or included in specific road or path segment records, node records, an index, or other data structures. For example, determined real-world geographic coordinates for a road sign or a road lane may be stored in or linked with a road segment record associated with the actual portion of the real-world road that includes the road sign or the lane. Accordingly, when data corresponding to the road segment record is accessed, such as by a navigation system or a modeling device, the determined geographic coordinates or position data are accessed for navigation-related services, modeling, or other purposes.

Figure 2:
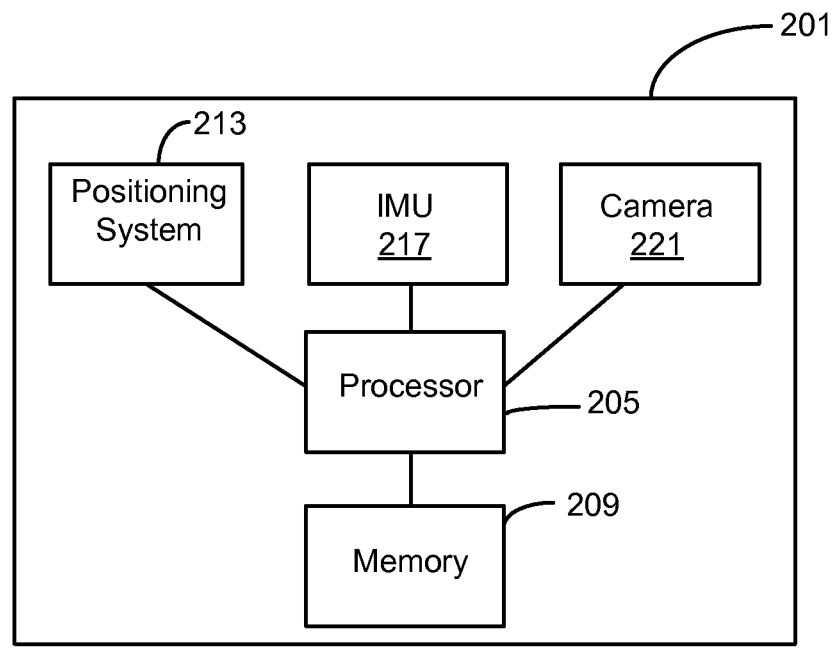
FIG. 2 illustrates components of a device that may be used in the system of FIG. 1.

FIG. 2 illustrates components of a device 201 used in the system 100. For example, the device 201 may be an embodiment of the object 112, such as a vehicle, or may be similar to the supporting device 116. In one embodiment, the device 201 is a support or housing that includes equipment to collect image data. For example, the device 201 is removably or integrally attached or connected to a vehicle. The device 201 is positioned at a top frontend of the vehicle. Alternatively, the device 201 may be positioned on or in any part of the vehicle at any angle.

The device 201 includes, but is not limited to, a processor 205, a memory 209, a positioning system 213, an inertial measurement unit ("IMU") 217, and a camera system or device 221. Additional, fewer, or different components may be provided. For example, an input device may be provided. The input device may be one or more buttons, keypad, keyboard, mouse, stylist pen, trackball, rocker switch, touch pad, voice recognition circuit, or other device or component for controlling or inputting data in one or more of the components of the device 201. Also, laser devices, such as one or more Light Detection and Ranging ("LIDAR") devices may be provided. While the components in FIG. 2 are shown as separate from one another, one or more of these components may be combined. Also, some of the components may be provided outside of the device 201. For example, if the device 201 is a housing attached to a vehicle, the positioning system 213, the processor 205, the memory 209, an input device, and/or other components may be in the vehicle or another part of the vehicle while the camera system or device 221 is in the device 201.

The processor 205 is a general processor, application-specific integrated circuit ("ASIC"), digital signal processor, field programmable gate array ("FPGA"), digital circuit, analog circuit, or combinations thereof. The processor 205 is one or more processors operable to control and/or communicate with the various electronics and logic of the device 201. The processor 205 is configured to operate the collection equipment, such as the positioning system 213, the IMU 217, and the camera system or device 221. For example, the processor 205 sends commands to the various collection devices to collect data and synchronizes or manages the different components. Also, the processor 205 is configured to associate and store data from the collection devices into the memory 209.

The memory 209 is any known or future storage device. The memory 209 is a non-volatile and/or volatile memory, such as a Random Access Memory "RAM" (electronic), a Read-Only Memory "ROM" (electronic), or an Erasable Programmable Read-Only Memory (EPROM or Flash memory). A memory network may be provided. The memory 209 may be part of the processor 205. The memory 209 is operable or configured to store collected image data and/or other data. The memory 209 may be part of the computer-readable medium 120 or may be a separate memory.

The positioning system 213 is a GPS system, one or more mechanical and/or electrical sensors, one or more gyroscopes, a local positioning system, one or more direction sensors, or other system or device for providing position data, such as location data (e.g., longitude, latitude, altitude, and/or other coordinates) and/or direction data, of the device 201, components thereof, or an attached object, such as a vehicle. The IMU 217 may be part of or separate from the positioning system 213. The IMU 217 may include one or more accelerometers, gyroscopes, and/or other components. The IMU 217 detects current rate of acceleration as well as changes in rotational attributes, such as pitch, roll, and yaw. Data from the IMU 217 may be used for error corrections, data compensation, and other purposes.

The camera system 221 includes one or more cameras used for taking pictures or videos of a surrounding area. For example, the camera system 221 includes a video camera that records video data (such as in the visible light spectrum or other spectrum) representing geographic features of and about a road or path as a vehicle drives along the road or path. The camera system 221 may also capture still photographs separate from the video data. The camera system 221 is able to capture different colors and associated text of geographic features. In one embodiment, at most one camera is used to collect or capture images for determining geographic position information of geographic features.

Figure 3:
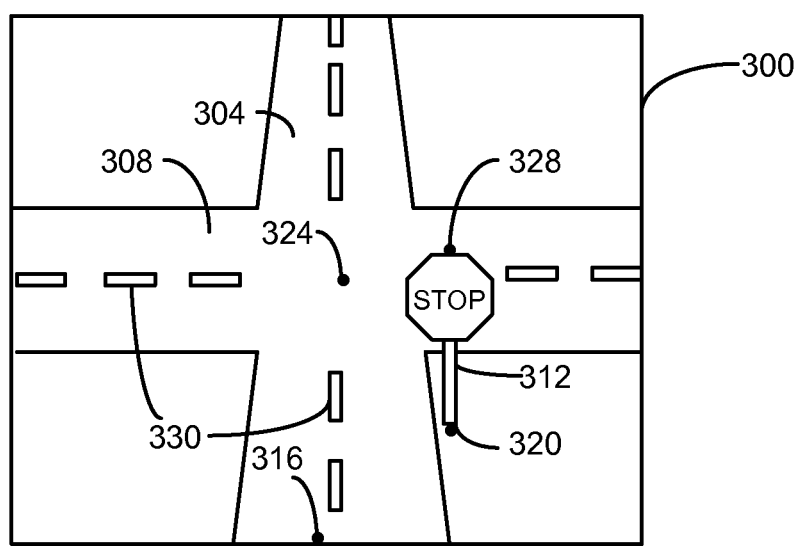
FIG. 3 is an embodiment of an image that illustrates objects or geographic features of which geographic position information can be determined.

FIG. 3 is an embodiment of an image 300 that illustrates points or regions of position information of objects or geographic features that can be determined. The image 300 is in a bitmap, JPEG, GIF, and/or other image format. In one embodiment, the image 300 is a single image of a plurality of images captured by the camera device 221 or other camera while driving along road 304 represented in the image 300. The image 300 is stored, such as in a medium 120, and then sent to the map developer. The image 300 is displayed, such as on the user interface 128. In one embodiment, a user and/or map developer employee views the image 300. The image 300 includes image representations of the road 304, a road 308, a road sign 312 (such as a STOP sign or other sign), and other geographic features. The roads 304 and 308 include markings 330, such as lane markings or other road markings.

The user may select points, areas, objects, or regions in the image 300 to retrieve or obtain geographic position data (such as coordinates) corresponding to the selected points, areas, objects, or regions. The position data may be a real-world coordinates, such as latitude, longitude, and/or altitude coordinates, of an object, feature, or portion thereof in the image 300. For example, if the user wants to know the latitude and longitude coordinates or values of an intersection between the roads 304 and 308, the user can select a point 324 to determine the latitude and longitude at the intersection. The processing device 124, using the geographic position software application 152, determines or calculates the geographic coordinates of the selected point 324 from the single image 300. For example, a reference point 316 having known position data is used in determining position data of selected point 324. The determined coordinates or position information may be displayed over or on the image 300, in a separate window or screen. Alternatively, the determined coordinate or position information may be stored in a data file.

Similarly, geographic position information or coordinates of other objects or features in the image 300 may be determined. For example, the user may want to know geographic position data of the road sign 312. Accordingly, the user selects or creates an endpoint 320. Based on the selection or marking, the processing device 124, using the geographic position software application 152, determines or calculates the position data or real-world coordinates of where the road sign 312 is located from the single image 300. Furthermore, vertical position data may also be calculated or extrapolated. For example, a user may select or input a point 328 to determine an altitude coordinate or vertical position information relating to the height of the road sign 312 (e.g., an option may be provided to choose a height or vertical calculation rather than a ground calculation). The determined geographic position data may be displayed and are stored, linked, or associated with the geographic database 132 and/or data thereof. The selection of geographic objects or points or portions thereof in the image 300 may be made via a touch screen display, an input device (such as a keyboard or mouse), or other means. The points, selections, markings, or inputs may be made anywhere in the image 300.

Figure 4:
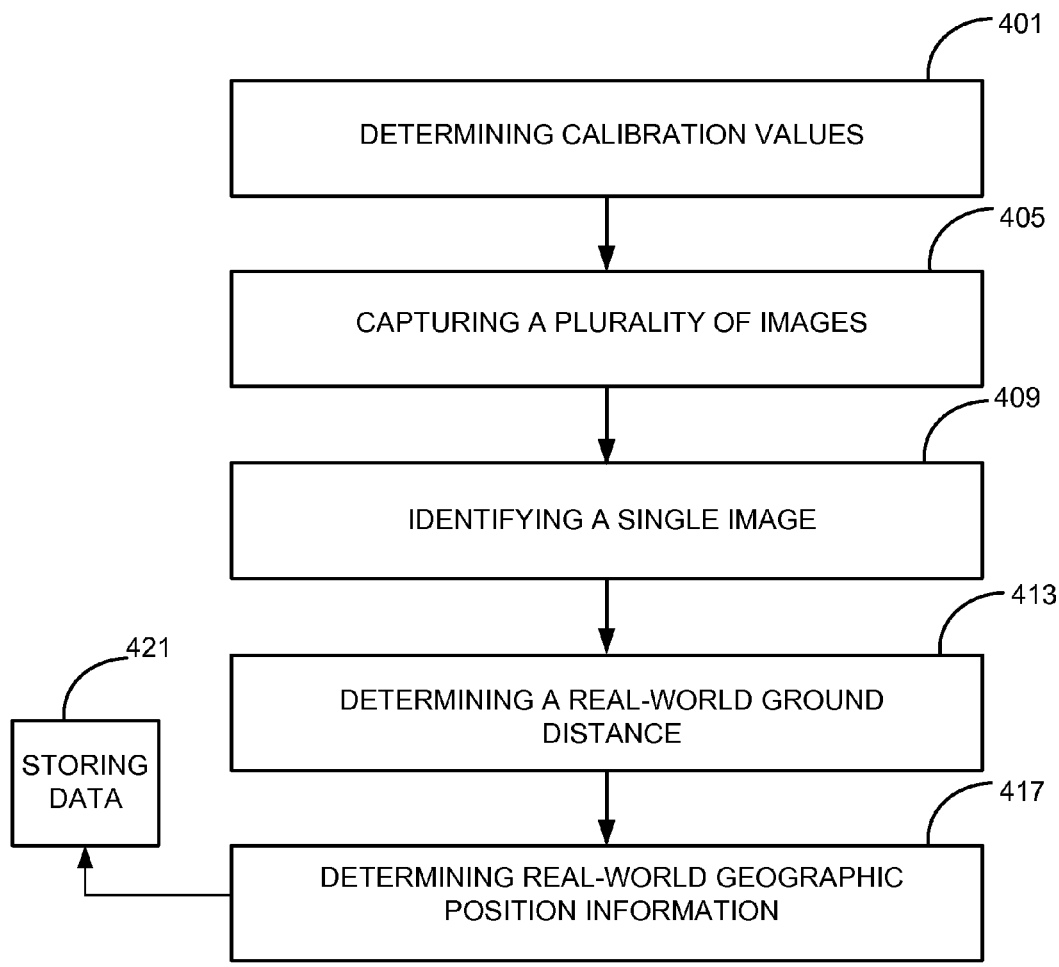
FIG. 4 is a flowchart of a method for determining geographic position information from a single image, such as the image of FIG. 3.

FIG. 4 is a flowchart of a method for determining geographic position data or information from a single image, such as the image 300. Fewer or more steps or acts may be provided, and a combination of steps may be provided. Also, the steps or acts may be performed in the order as shown or in a different order. The method is implemented by the system and/or devices described herein or by different devices or systems.

Calibration values of a camera, such as the camera 221, are determined or calculated (Step 401). For example, the map developer or associated computer, entity, and/or person thereof determines calibration values associated or corresponding to a camera used to capture images to determine geographic position data, such as a camera mounted on a data collection vehicle of the map developer. The calibration values may include intrinsic and/or extrinsic parameters relating to the camera. Intrinsic parameters include focal length, an angle between a horizontal axis and vertical axis of an image, and/or other parameters. Extrinsic parameters may specify the location and orientation of the camera. For example, extrinsic parameters may include camera roll, pitch, yaw, elevation above a plane, and/or other parameters.

In one embodiment, to simplify and/or minimize the number of intrinsic and extrinsic parameters to determine, the map developer may take some steps or estimations regarding some of the parameters. For example, regarding intrinsic parameters, the map developer may assume that the angle between the horizontal axis and the vertical axis of the image to be about 90° and that the origin point is the center of the image. Regarding, extrinsic parameters, the map developer may define the vanishing direction in the image by finding a vanishing point (intersection of two parallel lines in the image) to reduce the extrinsic parameters to be determined to two, i.e., the camera roll angle about the vanishing direction and the elevation, which may be implicit in a scaling factor. The scaling factor may be determined, such as in a last or final step, by taking a measurement in the real-world coordinate system. Accordingly, the map developer focuses on determining the focal length parameter ($\alpha$) and the camera roll angle ($\phi$) for determining position data (such as a real-world coordinate) from a single image. More or less parameters may be focused on for determination.

Figure 5:
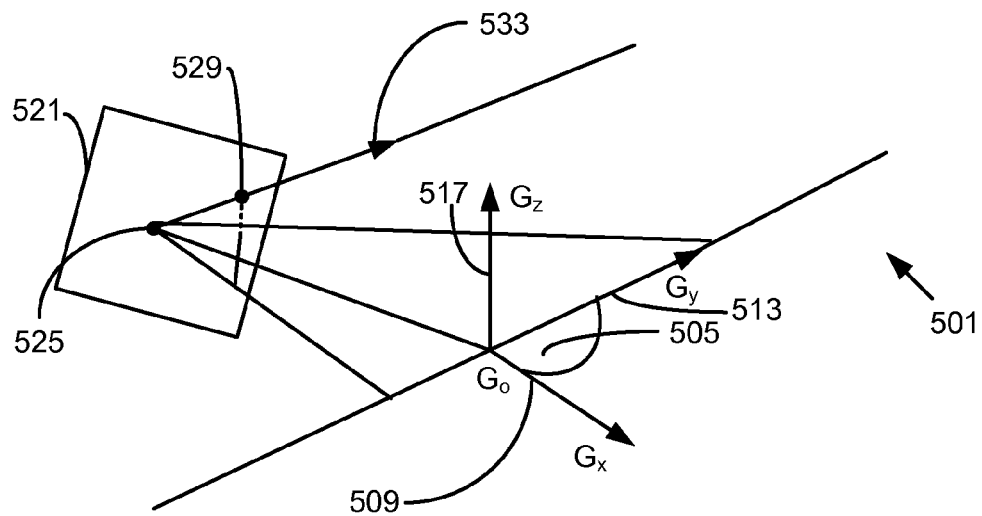
FIG. 5 illustrates a relationship between an image plane and a ground plane used in the system of FIG. 1 and/or in the associated methods.

FIG. 5 illustrates a relationship between an image plane 521 and a ground plane 505 relating to modeling and/or determining the calibration values, such as the focal length parameter ($\alpha$) and the camera roll angle ($\phi$), as well as relating to determining geographic position information from a single image, such as the image 300. For example, point 525 is a center of projection, and the point 529 is the vanishing point in the image. A three-dimensional ground coordinate system is projected from the image plane 521. The ground coordinate system includes a z-axis 517 ($G_z$), a x-axis 509 ($G_x$), and a y-axis 513 ($G_y$). The plane between the x-axis and the y-axis is the ground plane 505. Also, the y-axis 513 is parallel to a vanishing direction 533 of the image plane.

The x-axis 509 may be modeled as:

$$G_x = \begin{bmatrix} (1-\alpha v_x^2)\cos\varphi + \alpha v_x v_z \sin\varphi \\ v_z \sin\varphi - v_x \cos\varphi \\ -(1-\alpha v_z^2)\sin\varphi - \alpha v_x v_z \cos\varphi \end{bmatrix}^T$$

wherein T indicates transpose Also, a normalized vanishing direction is modeled as [$v_x$, $v_y$, $v_z$]. Furthermore, the focal length may be characterized as $\alpha = 1/(1+v_y^2)$.

The z-axis 517 may be modeled as:

$$G_z = \begin{bmatrix} (1-\alpha v_x^2)\sin\varphi - \alpha v_x v_z \cos\varphi \\ -v_x \sin\varphi - v_z \cos\varphi \\ (1-\alpha v_z^2)\cos\varphi - \alpha v_x v_z \sin\varphi \end{bmatrix}^T$$

The y-axis 513 coincides with the vanishing direction 533 that may be computed as $A^{-1}x$, where x is the vanishing point 529 and A is the camera intrinsic parameters matrix:

$$A = \begin{bmatrix} \alpha_u & -\alpha_u \cot\theta & u_0 \\ 0 & \dfrac{\alpha_v}{\sin\theta} & v_u \\ 0 & 0 & 1 \end{bmatrix}$$

wherein $\alpha_u$ is the horizontal component of the focal length and $\alpha_v$ is the vertical component of the focal length. The coordinates $u_0$ and $v_0$ are the origin point or the center of the image. Also, $\theta$ is the angle between the horizontal axis and the vertical axis of the image, which may be about 90°.

Using the above equations and/or relationships, projections of image points, such as of the image 300, onto the ground plane 505 may be computed. For example, given an image point x, $p = A^{-1}x$ is a vector in the direction of a ray from the camera center through x. One can solve for the intersection of this ray and the ground plane 505 to obtain $$P = \frac{G_{z2}}{\hat{p} \cdot G_z} \hat{p},$$

where $G_{z2}$ is the second element of $G_z$ and $$\hat{p} = \frac{p}{\|p\|}.$$

P being a point on the ground plane 505 that corresponds to an image point in the image plane 521. For example, if x is the point 324 in the image 300 of FIG. 3, then P is the projection of the point 324 on the ground plane 505. Accordingly, given two projection points, P1 and P2 (such as a reference image point and a target image point), on the ground plane 505, a distance between them is $\|P_1 - P_2\|$. One can also compute the distance between P1 and P2 along the direction of the x-axis 509 and the y-axis 513 as:

$|(P_1 - P_2) \cdot G_x|$ and
$|(P_1 - P_2) \cdot G_y|$.

Accordingly, real-world distances, such as ground distances, may be calculated or determined from a single image, such as the image 300.

Understanding the relationship between the calibration values and the ground coordinate system, the map developer may determine or calculate appropriate calibration values (the focal length parameter ($\alpha$) and the camera roll angle ($\phi$)), such as by using a ground truth method. For example, the camera used on the map developer's vehicle has a substantially fixed focal length, and the focal length may be determined, such as offline or at any other time. In one embodiment, the calibrated value of the focal length may be $\alpha_u = 1833.35507$ and $\alpha_v = 1822.48858$. Other values may be used.

Figure 6:
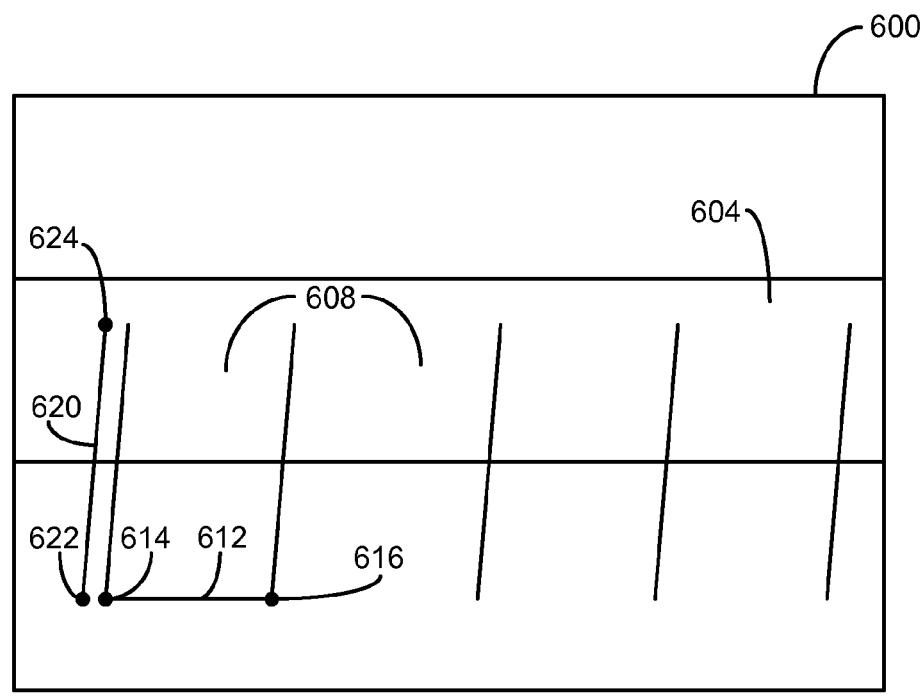
FIG. 6 is an embodiment of an image used for calculating calibration values used in the system of FIG. 1 and/or in the associated methods.

To determine the camera roll angle, a comparison between real-world measurements and computed or calculated measurements may be used. For example, FIG. 6 is an embodiment of an image 600 used for calculating calibration values.

The image 600 is taken or captured by the camera in a certain position on the vehicle of the map developer. The image 600 includes representations of a parking lot 604 having parking spaces 608. The map developer may physically measure a width 612 of a parking space 608 using a ruler or other measurement device at the real-world parking lot. Also, the map developer may physically measure a length 620 of the parking space 608 using the ruler or other measurement device. Then, the map developer may calculate the width 612 and the length 620 using the image 600. For example, a user of a computing device, such as the processing device 124 and/or the user interface 128, may select a point 614 and a point 616 to calculate the ground distance 612 based on the equations above. Also, the user may select a point 622 and a point 624 to calculate the ground distance 620. The calculated distances 612 and 620 are based on the calibrated focal length value and an initial or test camera roll angle value.

The calculated ground distances are compared to the actual measured ground distances, and the map developer can finely tune the camera roll angle value until the measured values substantially match the computed values. For example, a residual, r, is minimized using:

$$r = \sum_{i=1}^{n} \left( \frac{d_i m_0}{d_0 m_i} - 1 \right)^2$$

Wherein m are the measured distances and d are the computed distances. The camera roll angle value that produces the least difference between the measured and computed values is used as the calibrated value. Accordingly, the calibrated values of the focal length parameter ($\alpha$) and the camera roll angle ($\phi$) are determined for the camera, such as the camera mounted on the map developer vehicle.

Referring back to FIG. 4, a plurality of images of geographic features are captured by the camera, such as by the calibrated camera system 221 (Step 405). For example, the map developer employs a driver to drive a vehicle, such as the object 112, on one or more roads to collect data to develop the map database 132. In one embodiment, image data, such as photographs and/or videos, of geographic features or areas about roads or paths are collected. Other data including positioning information or data, such a GPS data (e.g., latitude, longitude, and/or altitude) corresponding to the vehicle or data collection devices supported by the vehicle are collected. In an alternate embodiment, instead of or in addition to driving or riding a vehicle to collect images, a pedestrian may use a supporting device, such as the device 116 or 201, to collect the image data and/or other data. For example, a pedestrian carries or puts on a backpack or other transportation device (which may support the device 116 or 201) while walking on a path to collect data corresponding to the path.

The captured or collected images and/or other data are sent to a map developer. In one embodiment, the image data is associated with position data and/or other data, and all the data is sent in the same data file. Or, different data is sent separately with links or indicators associating the different data with each other. In one embodiment, images, such as the image 300, are stored on a computer-readable medium, such as the medium 120, and other collected data are stored on different media. Alternatively, different types of collected data may be stored on the same computer-readable medium. The computer-readable media are delivered to an office or facility of the map developer. For example, after a vehicle is finished collecting data, it returns to a facility of the map developer. Or, the media may be mailed or sent by carrier to a certain office or facility. Alternatively, the collected data is transmitted to the map developer via a wireless or wired network.

The images and/or other data are received by a processing device of the map developer, such as the processing device 124. In one embodiment, one or a single image is identified or selected from the plurality of captured images (Step 409). For example, image data files of the collected images are configured to be displayed on a user interface, such as the user interface 128. A user may select one of the image data files to display the associated image, such as the image 300, on a display. Alternatively, multiple images may be selected to be displayed in separate windows on the same screen or different screen shots. The user may select an image based on an identification indicator or other reason. For example, an algorithm may detect that a certain image includes a desired geographic feature, and the user may select that image for display. Alternatively, the processing device 124 and/or the user interface 128 may automatically display one or more images based on desired detection, indicators, predetermined factors, and/or conditions.

If multiple images are displayed on one or more screens or windows or if one image is displayed, geographic position data or information, such as real-world coordinates, are determined from or based on a single image, such as the image 300. For example, a real-world ground distance between a selected point in the image and a reference point in the image is determined (Step 413). In one embodiment, an image, such as the image 300, is displayed. A point relating to a geographic feature, such as the point 324 relating to a road intersection in the image 300, is identified or selected. A user or developer may use a mouse, keyboard, or other input device to select the point. The selected point may correspond to an edge, boundary point, end, center, or other portion of a geographic feature, such as a road or path sign, a road or path marking, a POI, or other feature or object in an image. The point may be selected to be on or next to the geographic feature.

A reference point, such as the reference point 316, in the image is identified. For example, the reference point is a point with a known or predetermined constant position (e.g., the reference point corresponds to a known ground location, such as a point corresponding to a known coordinate or latitude and longitude). In one embodiment, the reference point in the image is a point at the center of the bottom edge of the image. Alternatively, the reference point may be placed or determined to be anywhere else in the image.

A real-world distance between the selected point and the reference point is determined. For example, the selected point and the reference point in the image are in an image plane, such as the image plane 521. Using the equations and mathematical relationships discussed above, corresponding ground points on a ground plane, such as the ground plane 505, are determined. Then, using the determined calibration values, a ground distance value may be calculated. For example, the processor 144 identifies the determined calibration values to compute a real-world ground distance corresponding the distance between the selected point and the reference point. Also, error correction or compensation may be performed to obtain more accurate distance values based on collected data, such as data collected by the IMU 217.

Figure 7:
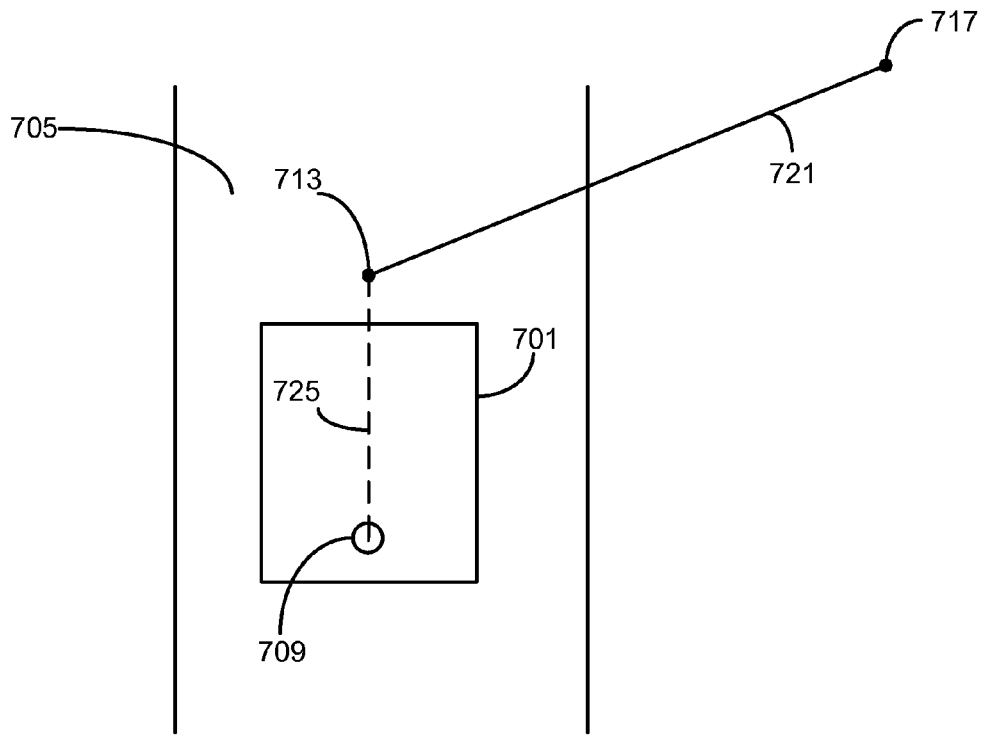
FIG. 7 is a diagram illustrating a distance to be determined in a step of the flowchart of FIG. 4.

FIG. 7 is a diagram illustrating a distance 721 between a desired ground point 717 corresponding to the selected point in the image and a reference ground point 713 corresponding to the reference point in the image (such as the image reference point 316). For example, a vehicle 701 travelling on road 705 captures the image (such as the image 300) used to select the point (such as the point 324) and to determine the distance between the reference point and the selected point. A calibrated camera on the vehicle 701 is positioned such that the reference ground point or location 713 corresponds to a center bottom edge of the images or pictures taken by the camera. Alternatively, the ground location 713 corresponds to another fixed image point in the images or photos taken by the camera. Accordingly, the position of the reference ground point 713 relative to the vehicle 701 and/or a GPS or positioning system or device 709 is known (i.e., the reference image point is associated with a known ground location). When the distance between the reference point in the image and the selected point in the image is calculated, the system knows that the calculated distance corresponds to or is the distance 721 between the reference ground location 713 and the desired ground point or location 717.

Referring back to FIG. 4, geographic position information, such as real-world position data, corresponding to the selected point (such as the point 324) in the image is determined or calculated from the single image (Step 417). For example, geographic coordinates, such as latitude and longitude coordinates, of the selected point in the image are determined or calculated. In one embodiment, the coordinate data may be calculated based on the positioning system of the vehicle or object that captured the image. Referring to FIG. 7, a distance 725 between a positioning system or device 709 (such as the positioning system or device 213) and the reference ground point 713 is known or predetermined based on the positioning of the positioning system 709 and the camera about the vehicle 701 (e.g., the point 713 has a predetermined and/or constant position relative to the object or vehicle 701 and/or the positioning device 709). Accordingly, when the camera captured or collected the image, the geographic coordinates or latitude and longitude of the positioning system 709 was also captured or stored, and the geographic coordinates or latitude and longitude of the reference ground point 713 may be determined based on the known or relatively constant distance 725.

When the geographic coordinates or position data of the reference ground point 713 (which corresponds to the reference point in the image) is calculated, the geographic position data or coordinates of the desired ground point 717 (which corresponds to the selected point in the image) may be determined based on the previously calculated distance 721. For example, formulas to calculate coordinates of the selected point in the image are:

$$lat2 = a\sin(\sin(lat_1)*\cos(d/R)+\cos(lat_1)*\sin(d/R)*\cos(brng)) \quad (1),$$

$$lon2 = lon_1 + a\tan 2(\sin(brng)*\sin(d/R)*\cos(lat_1), \cos(d/R)-\sin(lat_2)*\sin(lat_2)) \quad (2),$$

where (lat2, lon2) correspond to a latitude and longitude values of the selected point in the image. Also, (lat1, lon1) correspond to the latitude and longitude values of the reference point in the image determined previously. R refers to the radius of the Earth, d refers to the distance value (such as the distance 721) calculated between the reference image point and the selected image point, and brng refers to bearing.

Figure 8:
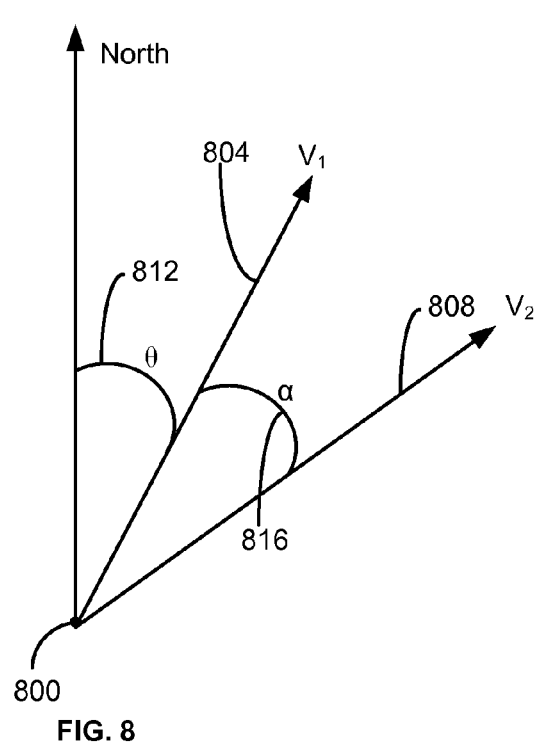
FIG. 8 illustrates direction information used in the system of FIG. 1 and/or in the associated methods.

FIG. 8 illustrates direction information used in calculating geographic position information of a selected point from a single image. For example, an object or vehicle 800 corresponds to the object or vehicle 112, 201, or 701. The angle 812 (θ) corresponds to the angle between a driving direction 804 (v1) and North, and the angle 816 (α) corresponds to the angle between the driving direction 804 (v1) and an object viewing direction 808 (v2) (such as the viewing direction of a geographic object or point thereof selected to obtain its geographic coordinates). The angle 812 (θ) may be determined from an IMU, such as the IMU 217, an inertial navigation system, or other device associated or on the object or vehicle 800. The angle 816 (α) may be modeled as: α=a cos(dot(v1, v2)). Furthermore, brng, used in equations (1) and (2) above, substantially equals the angle 812 (θ) plus the angle 816 (α).

Accordingly, based on the equations above, geographic position data of a selected image point may determined from a single image, such as the image 300 (e.g., no images other than the single image are used in conjunction with the calibration values). For example, multiple cameras and/or multiple images and correspondence or triangulation between them (such as in a stereo method) are not used to determine geographic position data, such as real-world coordinates, of image objects or points thereof. Error correction or compensation may be performed to obtain more accurate position values based on collected data, such as data collected by the IMU 217. The determined geographic position data or information may be displayed on or over the image or in a separate window or screen. Or, in addition to or instead of being displayed in association with the image, the determined values may be saved in a data file that may be accessed at the present or later time.

Regarding, altitude or vertical calculations or determinations of geographic features or points in an image, additional steps or methods may be utilized. For example, the equations and techniques above focus on determining points on a ground plane from projections from an image plane. Therefore, height or vertical determinations may use incremental techniques to estimate or calculate altitude or similar vertical coordinate values. In one embodiment, if a user selects a point corresponding to a vertical or altitude position, such as the point 328 in the image 300, the processing device 124 may first determine the ground point in the ground plane (such as the ground point corresponding to the point 320 associated with a bottom of the road sign 312). Then a vertical distance in the ground plane may be incrementally computed. For example, after the ground point is determined, a predetermined vertical distance is added. Then that vertical distance is projected from the three-dimensional ground coordinate system back into the image plane to determine if the vertical distance matches an image distance to the selected point 328 in the image 300. If the vertical distance is too short, then the vertical distance is extended and a similar comparison as before is done. This process occurs incrementally until the vertical distance in the ground coordinate system matches the height in the image plane to reach the point 328. Then an altitude value may be calculated based on the altitude point of the ground point (e.g., the point 320).

Using the techniques above, actual comparison data between ground truth values and computed values have been obtained. Data about ground coordinates, such as ground latitude and longitude values in a parking lot, are provided in Table 1 below. The points A, B, and C are random ground points selected in an image of the parking lot. The numbers in the parentheses are the ground truth values of the real-world locations corresponding to the points A, B, and C (such as measured by a handheld GPS device or other device), and the numbers before them are the computed values of the points A, B, and C.

TABLE 1

| Points | Latitude | Longitude |
| --- | --- | --- |
| A | 41.92985 (41.92984) | −87.68352 (−87.68352) |
| B | 41.92983 (41.92982) | −87.68363 (−87.68363) |
| C | 41.92976 (41.92975) | −87.68360 (−87.68362) |

Referring back to FIG. 4, after the geographic position information or data are determined from respective single images, the position data are stored (Step 421). For example, determined geographic coordinates or position data may be stored in a road or path segment or node record that represents that real-world portion of the road, path, or area that includes the geographic feature corresponding to the determined position data. Accordingly, the determined position data may be an attribute associated with a path or road segment or other map data structure (e.g., of the map database 132) and is used for map display, map guidance, and/or other navigation related features. Alternatively, the determined position data may be stored separately from path/road segment or node records (e.g., an index may be used to associate or link determined coordinates with appropriate nodes, segments, and/or other map data structures or layers). Also, the determined geographic position information may be stored in a database separate from the navigation database 132.

The different steps, acts, or processes of the methods described herein may be mixed and matched. Also, the methods mentioned herein may be implemented by a computer application, such as the geographic position software application 152, which is executed by one or more processors, such as the processor 144.

Alternatives

As mentioned above, the processing of the collected image data and/or other data may occur in a processing device at a map developer facility. Alternatively, some or all of the processing of the collected data may occur in the object collecting the data or components thereof, such as the vehicle or collection devices supporting the vehicle. Semi-processed or full processed data may then be sent to or transmitted to the map developer for further processing and/or storage in the map database.

As described above, the determined geographic position data of geographic features or associated points from an image are stored in a map database and may be used for navigation related functions or services. However, the generated or determined position data may also be used for other applications. For example, the geographic position values may be used for video games, virtual reality applications, computer graphics programs, city modeling and/or other map, geographic, or location based applications.

Regarding the ordering of method steps, the description above explains the determination of calibration values before collecting images about roads or paths by the map developer. However, the determination of the calibration values may occur after image data has been collected by the vehicle or pedestrian of the map developer. Also, one of the images collected along a path or road may be used as a reference image to determine the calibration values.

Furthermore, as described above, a user or map developer selects points or areas in a displayed image to determine the real-world geographic position of a geographic object in the image. However, automatic selections may be made. For example, recognition software may be used to detect signs or road features, and based on detection, automatic selections, such as desired points, of regions or objects may be provided. Accordingly, geographic position data of geographic objects in image data may be determined without displaying the image to a user.

Also, as mentioned above, one or more calibration values, such as the camera roll angle, are determined based on a comparison between measured distances and computed distances. In an alternate embodiment, a calibration value may be determined without using ground truth or physical measurements. For example, a geometric parameter, such as a width, of a lane or road object in an image may be estimated based on a standard size constraint or requirement (such as provided by a government entity). Also, another object in the image may be used as a key scale. For example, a width or length of a vehicle or object in the image may be known (e.g., dimensions of a vehicle may be found in a specification sheet), and one can use this information to estimate a distance value of another object in the same image. Accordingly, the calibration value may be determined based on comparing these estimations from the image (rather than physical measurements) with the computed values.

Figure 9:
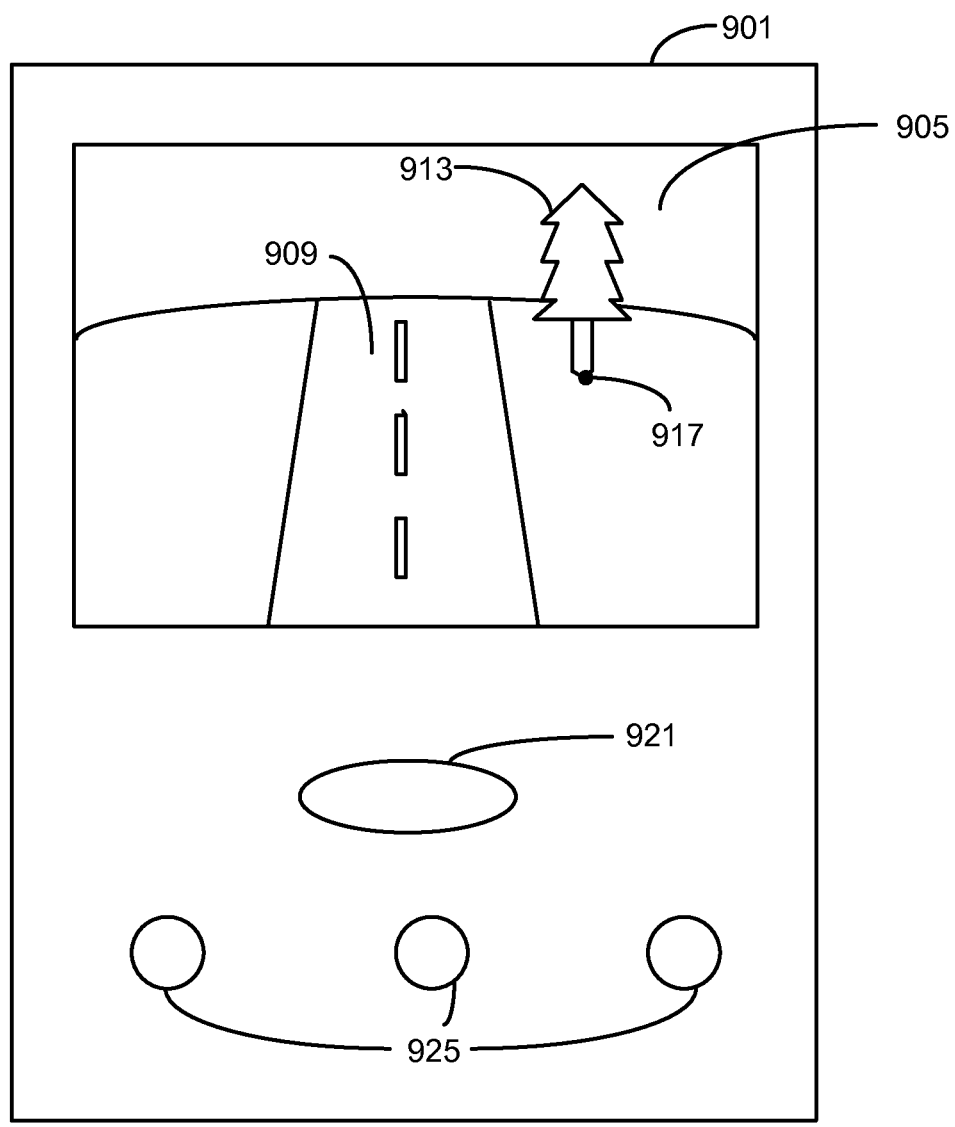
FIG. 9 is an alternate device for determining geographic position information from a single image.

FIG. 9 shows an alternate device 901 for determining position data from a single image. For example, the device 901 is a cellular phone, mobile phone, smart phone, personal digital assistant ("PDA"), handheld computer, a watch, a camera, a personal navigation device ("PND"), a portable navigation device, and/or any other electronic device. For example, the device 901 is a cellular telephone or smart phone, such as a cell or smart phone provided by Nokia Corporation located in Espoo, Finland. The device 901 includes a display 905, a navigation button 921, and input buttons 925. More or fewer components may be provided. For example, a camera and other audio/visual components may be provided.

In one embodiment, an end user separate from the map developer may receive one or more images captured by the map developer for developing the map database. For example, pictures or images of roads, sites, areas, etc. may be desirable to an end user. The end user or the device 901 may also receive the determined calibration values that are associated with the camera that took the pictures or images as well as other data, such associated vehicle GPS data. The device 901 includes or executes a geographic position software application, such as the application 152, so that the end user may determine position data, such as real-world coordinates, of an object or feature from an image based on the determined calibration values and/or other relationships or equations.

For example, the end user uses the device 901 to display an image of a road 909. The image is captured by a camera having the determined calibration values. Then the end user can select regions, geographic objects, or points thereof to determine position data. For example, the end user may be interested in the location of a tree 913 in the image. Accordingly, the end user selects or inputs a point 917. The application on the device 901 uses the determined calibration values to calculate the real-world distance, such as between a reference point in the image (similar to the point 316) and the selected point 917. Then, position data, such as latitude and longitude coordinates, are determined based on the determined distance, as described above. The determined position data for the point 917 may be displayed on the image or in a separate window.

Alternatively, the end user may be able to collect his or her own images via a camera associated with the device 901. Calibration values of the camera in a set position and/or orientation may be determined as described above. Accordingly, the end user may be able to determine geographic position data of selected image points from self collected images.

Furthermore, as described above, the collection of images occurs about or around roads or paths. In an alternate embodiment, images may be collected in any region or area, such as areas not associated with predetermined or fixed paths or roads. For example, images may be collected over different parts of an open area having no set paths.

The logic, software, or instructions for implementing the processes, methods and/or techniques discussed above are provided on computer-readable storage media or memories or other tangible media, such as a cache, buffer, RAM, removable media, hard drive, other computer readable storage media, or any other tangible media. The tangible media include various types of volatile and nonvolatile storage media. The functions, acts, steps, or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination.

Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU") or system.

It is intended that the foregoing detailed description be regarded as illustrative rather than limiting and that it is understood that the following claims including all equivalents are intended to define the scope of the invention.

We claim:

1. A method of determining real-world geographic position information of an object from an image, wherein the image is collected to develop a navigation database, the method comprising:
   capturing a plurality of images of geographic features, the plurality of images captured by a camera mounted on a vehicle;
   identifying a single image from the plurality of images;
   calculating a vanishing point in the single image as an intersection of lines in the single image;
   determining a real-world ground distance between a reference ground point in the single image and a ground point corresponding to an object in the single image, wherein determination of the real-world ground distance is based on the vanishing point in the single image and calibration values corresponding to the camera, wherein no images other than the single image are used in determining the real-world ground distance; and
   determining real-world geographic position information of the ground point corresponding to the object in the single image based on the determined real-world ground distance, the determined real-world geographic position information including a latitude coordinate and a longitude coordinate.

2. The method of claim 1, wherein the reference ground point represented in the single image corresponds to a point with a predetermined constant position relative to the vehicle.

3. The method of claim 2, wherein a center point at the bottom edge of the single image corresponds to the reference ground point.

4. The method of claim 1, wherein the object comprises a road sign or a road marking.

5. The method of claim 1, further comprising: determining an altitude coordinate corresponding to the object based on the single image.

6. The method of claim 5, wherein determining the altitude coordinate includes incrementally comparing a height in a three-dimensional ground coordinate system to the single image.

7. The method of claim 1, wherein the determined calibration values include a focal length of the camera and a camera roll angle.

8. The method of claim 1, further comprising: storing the determined real-world geographic position information in the navigation database.

9. The method of claim 1, wherein the determined calibration values are based on a projection of a three-dimensional ground coordinate system from an image plane.

10. The method of claim 1, wherein determining the real-world ground distance comprises entering the determined calibration values into mathematical models representing the reference ground point and the ground point corresponding to an object in a three-dimensional ground coordinate system, the three-dimensional ground coordinate system generated as a function of an image plane.

11. The method of claim 1, wherein determining the real-world geographic position information of the ground point corresponding to the object comprises using the determined real-world ground distance with a bearing of the object to calculate the latitude coordinate and the longitude coordinate.

12. A method of determining a geographic location in an image, the method comprising:
   determining calibration values relating to a camera, wherein the camera captures an image at the determined calibration values;
   calculating a vanishing point in the image;
   identifying a reference point in the image, the reference point corresponding to a predetermined position relative to the camera;
   identifying a selected point in the image, the selected point corresponding to a real-world location represented in the image;
   determining a real-world distance between the reference point and the selected point represented in the image, wherein the determination of the real-world distance is based on the calibration values and the vanishing point in the image; and
   determining real-world geographic coordinates corresponding to the selected point based on the determined real-world distance,
   wherein the real-world distance is determined using no images other than the image corresponding to the vanishing point, the reference point and the selected point.

13. The method of claim 12, wherein the selected point corresponds to a road feature in the image.

14. The method of claim 12, wherein the determined calibration values include an intrinsic value of the camera and an extrinsic value of the camera.

15. The method of claim 12, wherein the real-world geographic coordinates are determined based on the determined real-world distance and a bearing corresponding to the selected point in the image.

16. The method of claim 12, wherein the camera is mounted on a vehicle that collects images to develop a master navigation database.

17. A non-transitory computer-readable medium configured to store a computer program that performs a method of determining a real-world geographic position from a single image, the method comprising:
   identifying a calibration value associated with a camera, the identified calibration value including a determined extrinsic value of the camera at a the time an image was captured;
   computing a vanishing point in the image as an intersection point between two parallel lines in the image;
   computing a reference ground point based on an intrinsic parameter of the camera at the time the image was captured and at least the vanishing point in the image;
   determining a real-world distance between a desired ground point represented in the image and the reference ground point in the image using the identified calibration value and the single image; and
   calculating a latitude coordinate and a longitude coordinate associated with the desired ground point as a function of the determined real-world distance.

18. The non-transitory computer-readable medium of claim 17, wherein the determined extrinsic value comprises a camera roll angle.

19. The non-transitory computer-readable medium of claim 17, wherein the intrinsic parameter of the camera includes a focal length.

20. A device for determining a real-world geographic position from a single image, the device comprising:
   a user interface configured to display images captured by a camera;

a processor in communication with the user interface and configured to calculate a vanishing point in an image; and a memory in communication with the processor, the memory configured to store data of the images and data of predetermined calibration values of the camera, wherein the image is displayed on the user interface, wherein the processor is configured to determine a real-world distance between a reference point corresponding to a known ground location and a selected target point corresponding to another ground location in the displayed image based on the predetermined calibration values and the calculated vanishing point in the image, and wherein the processor is further configured to determine real-world geographic coordinates of the selected target point in the image based on the real-world distance.

* * * * *